A. V. MITCHELL.
SPRING SPOKE WHEEL.
APPLICATION FILED JULY 8, 1914.

1,222,233.

Patented Apr. 10, 1917.
2 SHEETS—SHEET 1.

Witnesses
G. F. Baker
F. C. Denny

Inventor
Augusta V. Mitchell
By
Foster, Freeman, Watson & Coit
Attorneys

A. V. MITCHELL.
SPRING SPOKE WHEEL.
APPLICATION FILED JULY 8, 1914.

1,222,233.

Patented Apr. 10, 1917.
2 SHEETS—SHEET 2.

Witnesses
G. F. Baker.
L. C. Denny.

Inventor
Augusta V. Mitchell
By
Foster, Freeman, Watson & Coit
Attorneys

UNITED STATES PATENT OFFICE.

AUGUSTA V. MITCHELL, OF WASHINGTON, DISTRICT OF COLUMBIA.

SPRING-SPOKE WHEEL.

1,222,233. Specification of Letters Patent. Patented Apr. 10, 1917.

Application filed July 8, 1914. Serial No. 849,813.

*To all whom it may concern:*

Be it known that I, AUGUSTA V. MITCHELL, a citizen of the United States of America, and resident of Washington, District of Columbia, have invented certain new and useful Improvements in Spring-Spoke Wheels, of which the following is a specification.

This invention relates to wheels which include resilient spring metal spokes, and it has been my object to improve the construction of the spokes making them in such form that the strains to which they are subjected in actual use will be uniformly distributed and will not be concentrated at one point more than another to cause breakage. The novel features of the invention will be apparent from the following description, taken in connection with the accompanying drawing.

Figure 1:
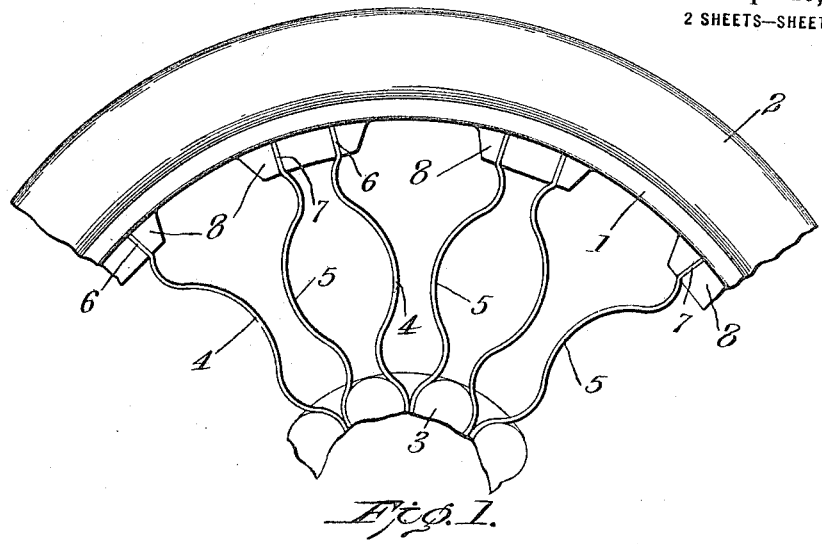
Figure 1 is a side elevation, partly broken away, showing a wheel having one form of my invention embodied therein.

As shown in Fig. 1, the wheel is made up of the rim or felly 1, carrying the tire 2, and the hub 3, together with the curved spring-metal spokes in pairs 4 and 5 connecting the hub with the rim. In the modification shown in this figure, the spokes of each pair are curved in toward each other at the hub and are then curved gradually in an outward direction away from each other, the curvature being continued until the spokes approach each other at the outer end near the rim. At this point, the spokes are again bent outwardly making a second reverse curve between the hub and the felly. The straight radial ends of the spokes enter radial slots in the hub and at the outer end of the spokes there are straight sections 6, 7, entering suitable sockets in the projection 8 on the rim. The ends 6 and 7 may be secured in the sockets by any suitable fastening means such as locking pins.

It will be observed that by the above construction there are two reverse curves in each spoke between the hub and the felly, and there are no sharp bends forming angles where there will be any excess strain. On the contrary, the strains on the spokes will be evenly distributed so that the likelihood of breaking will be reduced to a minimum and at the same time the spokes will be very resilient embodying that elasticity which is necessary to prevent transmitting shocks and jars to which the tire is subjected to the axle of the vehicle.

Figure 2:
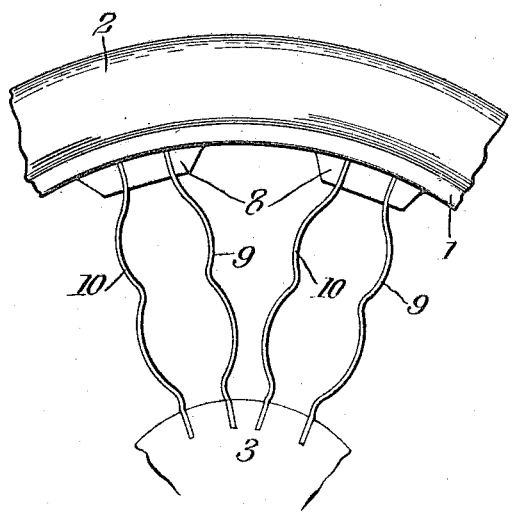
Fig. 2 is a similar view showing a modified construction.

In the modification shown in Fig. 2, the spring spokes 9 and 10 are made in pairs and have reverse bends at the hub as in the form shown in Fig. 1, except that the bend is not made quite so pronounced. The spokes are then bent outwardly as shown and midway between the hub and rim they are bent in toward each other and then outward, so as to form a reverse bend at the center part of the spoke. Each spoke is then bent around to a point where the two in the pair approach each other and they are then secured to the rim 1 or the socket 8 in any preferred way.

Figure 3:
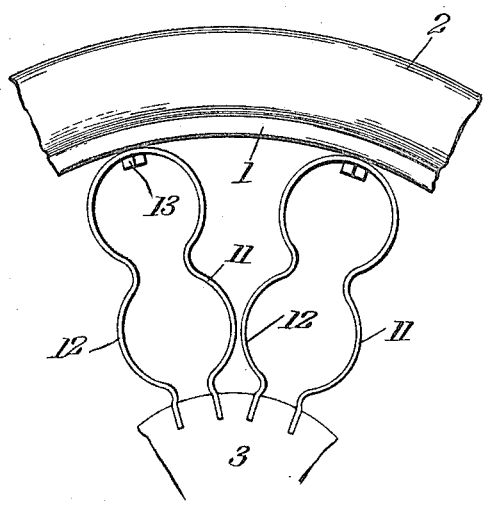
Fig. 3 is a similar view showing another modified construction.

In Fig. 3, I have shown a third modification in which the members 11 and 12 of each pair of spokes includes the reverse bend at the hub 3 and in addition a reverse bend between that point and the rim. The spokes are secured to the rim by any suitable means, and in this instance, I have shown a bolt 13 for that purpose. In this form as well as in the form shown in Fig. 2, there are no sharp bends in the spokes so that there is no particular point where the strains are made greater than others, and no point where breakage would be most likely to occur. The double reverse bends in the spokes give to them great resiliency and the use of these spokes makes a wheel which will have not only great lasting qualities but one which will relieve the machinery of the vehicle and the occupants from the effect of jars and shocks. Such reverse curves or bends may be located at any desired point in the length of the spoke.

Figure 4:
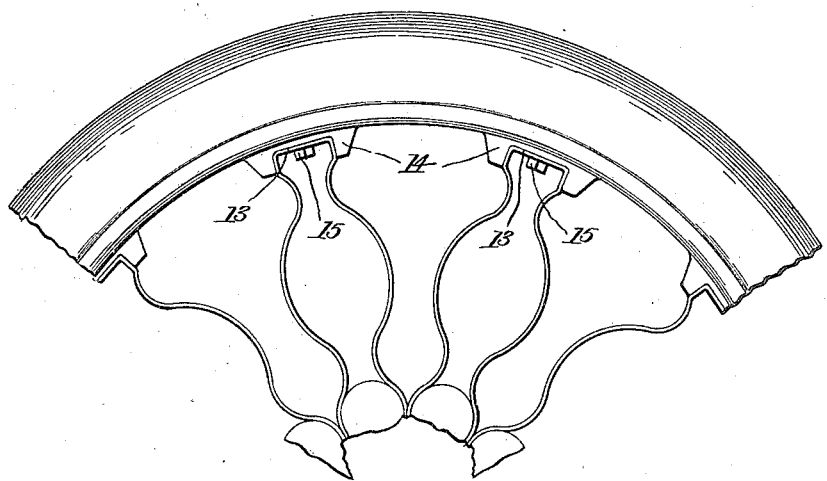
Fig. 4 is a side elevation partly broken away of a modification of that form of the invention shown in Fig. 1.

In Fig. 4, I have shown the spokes 4 and 5 made in one piece, the portion at the rim being bent to lie flat along the inner face of the rim at 13 or against the inner face of a socket formed in the projection 14, as shown. The outer ends of the spoke may be held by any suitable fastening means such as the bolt 15, and it will be understood that instead of having the two sides of the spoke made in one continuous piece, as shown in Fig. 4, the two may be made separately with bent ends overlapping each other along the rim within the socket in the projection.

Figure 5:
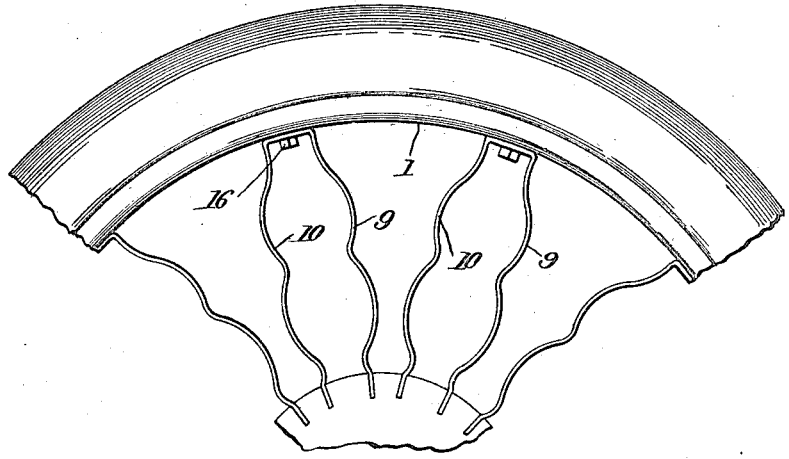
Fig. 5 is a modification of that form shown in Fig. 2.

In Fig. 5, the two spokes 9 and 10 are shown formed in a single piece bent out at the rim to lie flat against the rim. The spokes may be secured to the rim at this point by any suitable means, such as the bolt 16.

Having thus described my invention, what I claim is:

1. In a wheel of the class described including a hub and felly, of spokes made of spring metal strips arranged in pairs, the spokes of each pair being bent on a gradual curve toward each other at the hub and then on a gradual curve outward away from each other, then inward toward each other and then outward away from each other whereby there will be two reverse curves without sharp angles in each spoke between the hub and the felly, the radius of curvature in each instance being greater than the amount of the lateral bends.

2. In a wheel of the class described including a hub and felly, of spokes made of spring metal strips arranged in pairs, the spokes of each pair being bent on a gradual curve toward each other at the hub and then on a gradual curve of considerably greater radius outward away from each other and then inward toward each other and then outward away from each other at the rim on a curve similar to that at the hub, the said spoke being without sharp bends from one end to the other.

3. In a wheel of the class described including a hub and felly, of spokes made of spring metal strips arranged in pairs, the spokes of each pair having therein a plurality of gradual reverse bends, the bends in the spokes of each pair corresponding but facing in opposite directions and the center of one of said bends being midway between the hub and the felly.

In testimony whereof I affix my signature in presence of two witnesses.

AUGUSTA V. MITCHELL.

Witnesses:
  Lou H. Cadarr,
  Arthur L. Bryant.

Copies of this patent may be obtained for five cents each, by addressing the "Commissioner of Patents, Washington, D. C."